United States Patent [19]

Emanie

[11] Patent Number: 5,174,544
[45] Date of Patent: Dec. 29, 1992

[54] NORMALLY CLOSED PILOT OPERATED BI-DIRECTIONAL POPPET VALVE

[75] Inventor: Faraidoon Emanie, Roscoe, Ill.

[73] Assignee: Delta Power Hydraulic Co., Rockford, Ill.

[21] Appl. No.: 874,396

[22] Filed: Apr. 27, 1992

[51] Int. Cl.$^5$ ............... F16K 31/383; F16K 31/40
[52] U.S. Cl. ................... 251/30.01; 251/44; 137/493
[58] Field of Search .......... 251/30.01, 44, 43; 137/493

[56] References Cited

U.S. PATENT DOCUMENTS

| | | |
|---|---|---|
| 2,404,349 | 7/1946 | Brant et al. |
| 2,969,088 | 1/1961 | Kramer |
| 3,799,497 | 3/1974 | Zeuner |
| 3,862,738 | 1/1975 | Stumpmeier ............ 251/44 X |
| 4,526,340 | 7/1985 | Kelchimsky et al. |
| 4,592,533 | 6/1986 | Guglielmi |
| 4,679,586 | 7/1987 | Riedel ............ 137/453 X |
| 5,036,877 | 8/1991 | Distler ............ 137/493 X |
| 5,072,752 | 12/1991 | Kolchinsky ............ 137/493 |

Primary Examiner—Alan Cohan
Attorney, Agent, or Firm—Vernon J. Pillote

[57] ABSTRACT

A normally closed pilot operated bi-directional poppet valve for controlling flow between first and second valve ports. When the pilot valve is closed, pressure is applied from whichever port is at the higher pressure to the poppet in a manner to hold the poppet closed. When the pilot valve is open, pressure is vented to whichever port is at the lower pressure in a manner to allow the poppet to open.

19 Claims, 4 Drawing Sheets

Prior Art

NORMALLY CLOSED PILOT OPERATED BI-DIRECTIONAL POPPET VALVE

BACKGROUND OF THE INVENTION

There are various pilot operated two-way valves disclosed in the prior art, some examples of which are shown in U.S. Pat. Nos. 2,969,088; 3,799,497; 4,526,340 and 4,592,533. However, prior pilot operated two-way valves known to the applicant were not capable of blocking flow in both directions when closed and allowing flow in either direction when opened. There are some bi-directional valves in which the solenoid operates directly on a spool or poppet. However, because of the limited magnetic force produced by the solenoid, such direct acting valves can only have a small poppet and are only adapted to pass relatively low flows, for example up to five or six gallons per minute.

There are hydraulic systems, for example systems including hydraulic actuators or hydraulic motors where it is desired to operate the hydraulic actuator or motor in both directions and to selectively lock the actuator or motor in a moved position. Valves which are directly actuated by a solenoid are not suitable for such applications since they do not have sufficient flow capacity to enable rapid movement of the actuator or motor in either direction. While prior art pilot operated poppet valves can be made with adequate flow capacity to enable use in such systems, a single such valve would not be effective to hydraulically lock the actuator or motor in both directions, and it was common practice to use two such valves, one in each line to the actuator or motor.

SUMMARY OF THE INVENTION

It is the general object of the present invention to provide a normally closed pilot operated poppet valve which is operative to block flow in either direction through the valve when the solenoid actuated pilot is closed, and to open and pass flow in either direction when the solenoid actuated pilot is open.

Accordingly, the present invention provides a normally closed pilot operated bi-directional poppet valve comprising valve casing means defining a valve bore, a valve chamber at one end of the bore and a first pressure chamber communicating with the end of the valve bore remote from the valve chamber. The valve casing means has first and second valve ports communicating with the valve chamber and a valve seat intermediate the first and second valve ports. The valve seat is coaxial with the bore and has a cross-sectional area smaller than the cross-sectional area of the valve bore. An elongated valve member has an intermediate portion slidable in the bore, a reduced first end portion extending from one end of the intermediate portion and adapted for engagement with the valve seat to shut off flow between the first and second ports, and a reduced second end portion extending from the intermediate portion and having a distal end exposed to the fluid pressure in the first chamber. A sleeve member is slidable in the bore and slidably engages the second end portion of the valve member for movement between a forward position engaging the intermediate portion and a retracted position engaging an abutment on the valve casing means. The valve member and sleeve define a second pressure chamber in the bore between the intermediate portion of the valve member and one end of the sleeve member, and the other end of the sleeve member is exposed to fluid pressure in the first pressure chamber. A pilot valve passage means communicates with the first pressure chamber and the second pressure chamber and pilot valve means controls flow through the pilot valve passage means. A spring yieldably urges the pilot valve to a closed position closing the pilot valve passage and solenoid actuator means is provided for actuating the pilot valve to an open position. A first passage means communicates the first port with the second pressure chamber and the first passage means has first flow restrictor means therein and first check valve means operative to by-pass the first flow restrictor means when the pressure in the second chamber is greater than the pressure at the first main port. A second passage means communicates the second main port with the first pressure chamber and the second flow passage means has a second flow restrictor means and a second check valve means operative to by-pass the second flow restrictor means when the pressure in the first chamber is greater than the pressure at the second port.

When the first port is the high pressure port and the pilot valve is closed, pressure at the first port is applied through the first passage means to the second pressure chamber to press the valve member to a closed position. When the pilot valve is opened, the second pressure chamber is vented by way of the second check valve means of the second passage means and the valve member then moves to an open position. Conversely, when the high pressure is at the second main port, this pressure is transmitted through the second passage means to the first pressure chamber and acts on the sleeve member to press the valve member to a closed position. When the pilot valve is opened with pressure at the second port, the first pressure chamber is vented through the check valve means in the first flow passage and the sleeve member can then retract and allow the valve member to move to an opened position.

DETAILED DESCRIPTION

In the preferred embodiment illustrated, the valve is made for installation and removal as a cartridge from a valve or manifold body designated generally by the numeral 10. As best shown in FIGS. 1–4, the body 10 has a cavity 11 that opens at one side of the body and first and second fluid passage means 12 and 13 that communicate with the cavity. The cavity has a reduced diameter portion 11a at its inner end and an internally threaded portion 11b adjacent its outer end. A valve casing including a cage 15 and a retainer 16 are adapted to be assembled for installation and removal as a unit from the cavity 11. In the embodiment illustrated, the cage has an externally threaded end portion 17 that is received in an internally threaded retainer cavity 18 in the retainer 16, and the retainer is externally threaded as indicated at 19 for reception in the internally threaded portion 11b of the the body cavity. A means such as a O-ring 20 is provided to seal the interface between the retainer and the body cavity at a location adjacent the outer end of the body cavity.

Figure 1:
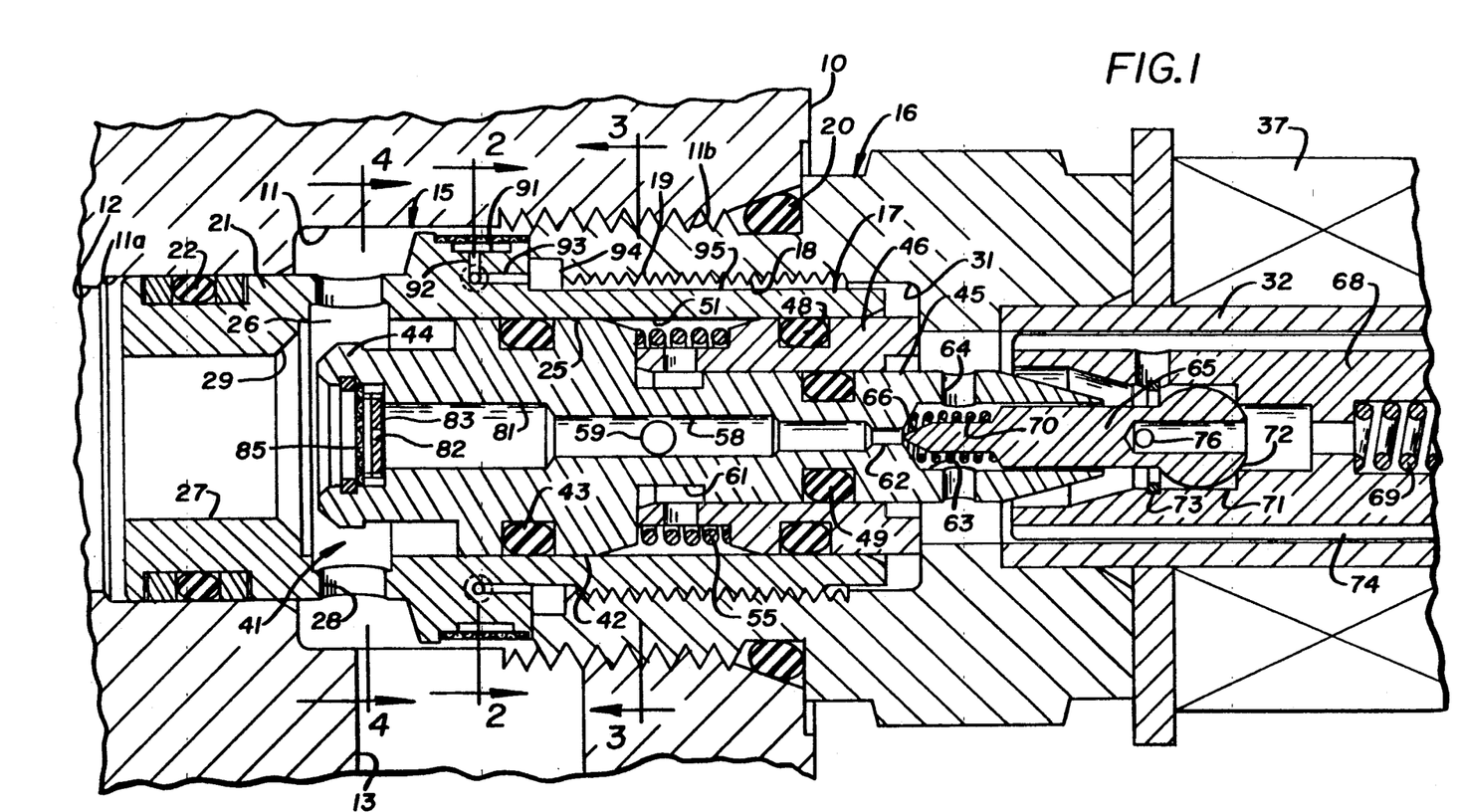
FIG. 1 is a longitudinal sectional view illustrating the valve member in an open position.

The cage has an inner end portion 21 that is received in the inner end portion 11a of the body cavity and sealed thereto as by O-ring 22. The cage has a valve bore 25 and a valve chamber 26 at one end of the valve bore. A first main valve port 27 in the cage communicates the first fluid passage 12 with the valve chamber 26 and a second main valve port comprising one or more openings 28 in the cage, communicates the chamber 26 with cavity body 10. The first valve port 27 defines a valve seat 29 at its juncture with the valve chamber 26 and the valve seat has a cross-sectional area smaller than the valve bore 25.

The retainer 16 defines a first pressure chamber 31 at the end of the cage 15 remote from the valve chamber and a tube 32 has one end mounted on the retainer in communication with chamber 31. The distal end of the tube is sealed by a plug 33 (FIGS. 5 and 6) and a solenoid actuator coil 37 surrounds the tube (See FIG. 1).

Figure 5:
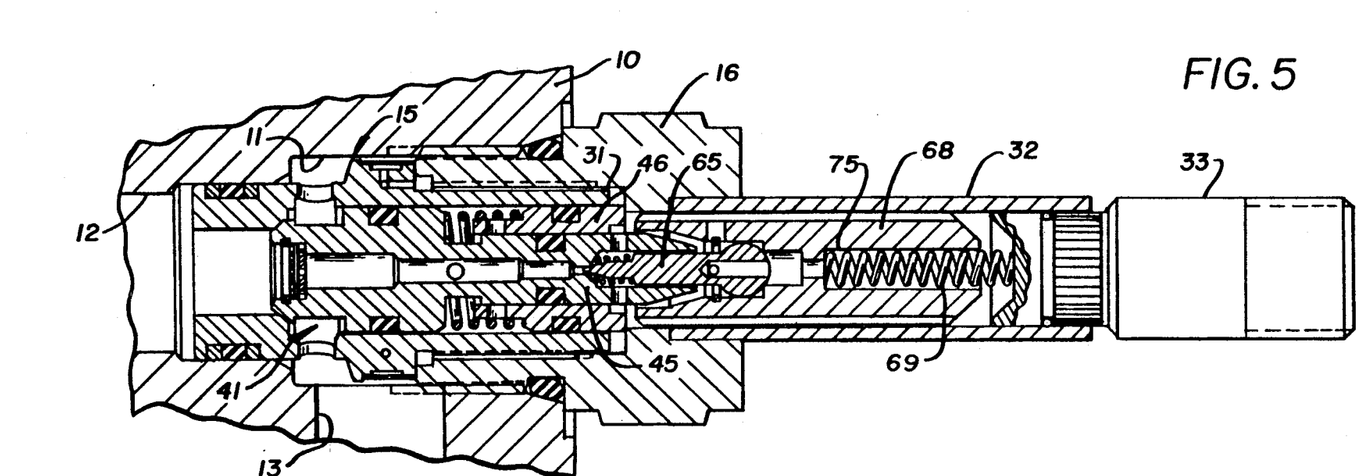
FIG. 5 is a longitudinal sectional view through the valve illustrating the valve in a closed position when pressure is at the first port.
Figure 6:
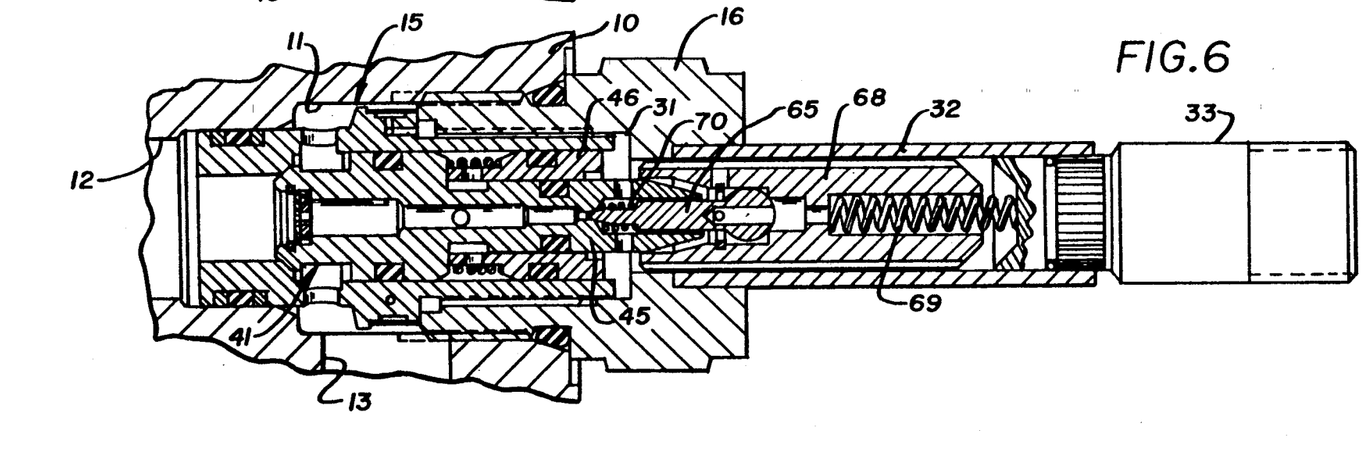
FIG. 6 is a longitudinal sectional view through the valve illustrating the valve in a closed position, when high fluid pressure is at the second port.

A valve member 41 has an intermediate portion 42 slidably received in the valve bore and sealed thereto as by an O-ring 43. The valve member has a reduced valve portion 44 on one end engageable with the valve seat 28 to shut off flow between the first and second main valve ports when the valve member is in a closed position. The valve member also has a reduced diameter stem portion 45 on the other end and the distal end of the stem portion is exposed to the fluid pressure in the first pressure chamber 31. A sleeve member 46 is slidably disposed in the valve bore and slidably receives the stem 45. The sleeve member is slidably sealed to the bore by an O-ring 48 and to the stem by an O-ring 49 and the valve member and sleeve member define a second pressure chamber 51 in the valve bore between the intermediate portion 42 and the forward end of the sleeve member 46, and the other or rear end of the sleeve member is exposed to fluid pressure in the first pressure chamber 31. The sleeve member is movable relative to the valve member between a position as shown in FIG. 5 in which the rear end of the sleeve member engages a shoulder or abutment on the retainer 16, and a position as shown in FIG. 6 in which the forward end of the sleeve member engages a rear face on the intermediate portion 42 of the valve member. A coil-type compression spring 55 is interposed between the intermediate portion 42 of the valve member and the sleeve member to yieldably urge the valve member toward a closed position. As will be seen, the forward end of the sleeve member is exposed to fluid pressure in the second pressure chamber 51 and the rear end of the sleeve member is exposed to fluid pressure in the first pressure chamber 31.

Pilot valve passage means are provided for selectively communicating the first pressure chamber 31 with the second pressure chamber 51. In the embodiment illustrated, the pilot valve passage means is formed in the valve member and includes a stepped bore 58 in the valve member. The bore 58 communicates at one end through lateral openings 59 in the valve member and recess 61 with the second pressure chamber 51. The other end of the stepped bore 58 communicates through a pilot port 62 counterbore 63 and lateral openings 64 with the first pressure chamber 31. A pilot valve member 65 is loosely disposed in the counter-bore 63 and has a tapered tip 66 arranged to block flow through the pilot port 62 when the pilot valve member is closed. The pilot valve member is operatively connected to a solenoid actuated plunger 68 that is slidable in the tube 32. The plunger 68 is yieldably urged in a direction to move the pilot valve to a closed position by a spring 69 so that the pilot valve is closed when the solenoid is deenergized. A pilot valve spring 70 is provided to maintain the pilot valve member 65 open when the solenoid is energized, and spring 70 is adapted to yield and allow the pilot valve to close under the force of spring 69 when the solenoid is de-energized. The plunger 68 has a stepped bore 71 opening at the forward end of the plunger and the pilot valve member 64 has a semi-spherical head 72 engageable with a shoulder in the bore 71 so that the pilot valve member is allowed to pivot on the shoulder relative to the plunger and align the tip 66 with the pilot valve port 62. A retainer ring 73 is disposed in the plunger to retain the pilot valve member in the bore 71 of the plunger. The plunger has lengthwise extending grooves 74 and passage 75 for equalizing fluid pressure at opposite ends of the plunger 68 and the pilot valve member has passages 76 for equalizing fluid pressure on the head 72.

Figures 2, 3, 4:
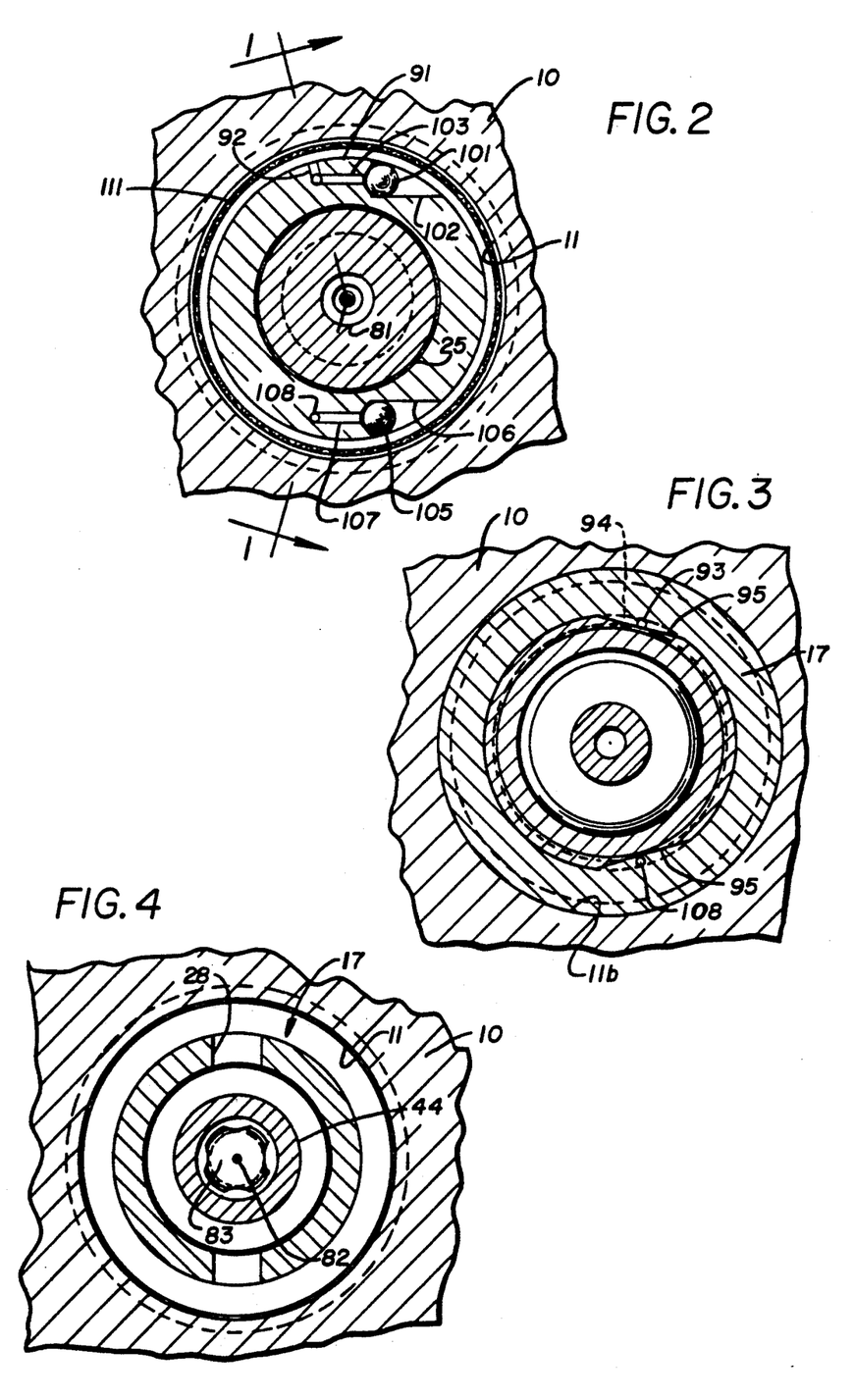
FIG. 2 is a fragmentary transverse sectional view taken on the plane 2—2 of FIG. 1.
FIG. 3 is a fragmentary transverse sectional view taken on the plane 3—3 of FIG. 1.
FIG. 4 is a fragmentary transverse sectional view taken on the plane 4—4 of FIG. 1.

A first passage means is provided for communicating the first valve port 27 and first fluid passage means 12 with the second pressure chamber 51. In the embodiment illustrated, the first passage means is formed in the valve member 41 and includes a stepped passage 81 in the valve member that communicates at one end with the first valve port 27, when the valve member is closed and which communicates at its other end through lateral openings 59 and recess 61 with the second pressure chamber 51. The first passage means has a first flow restrictor means 82 therein and a first check valve means 83 operative to by-pass the first flow restrictor means when the pressure at the second pressure chamber is greater than the pressure at the first port. As best shown in FIGS. 1 and 4, the check valve 83 is a disk type valve arranged to seat against a shoulder in the stepped bore 81 when the pressure at the first port 27 is greater than the pressure in the second pressure chamber 51, and the flow restrictor 82 comprises an opening in the disk valve member arranged to pass a restricted flow of fluid to the second pressure chamber when the disk valve member is closed. A filter 85, which may comprise a foraminous disk or mesh filter screen having a flow impedance that is low as compared to the flow restrictor 82, is disposed in the stepped bore 81 and is spaced from the check valve a distance sufficient to allow the check valve disk to open.

A second passage means is provided for communicating the second fluid passage means 13 and second valve ports 28 with the first pressure chamber 31 and, in the embodiment illustrated, is formed in the valve casing. As best shown in FIGS. 1, 2 and 3, the valve cage has a recess 91 that communicates with the intermediate portion of the body cavity and hence with the second fluid passage 13 and second valve port 28. A flow restrictor passage 92 extends inwardly from the recess 91 and communicates through a passage indicated at 93 with an annular distribution recess 94 in the retainer 16, and the distribution recess 94 is otherwise communicated through passages 95 formed by flats on the externally threaded portion 17 of the cage, into communication with the first pressure chamber 31. A check valve means is provided for by-passing the flow restrictor passage 92 when the pressure in the first chamber is greater than the pressure at the second port. As best shown in FIGS. 1 and 2, a check valve 101 is disposed in a counterbore 102 that extends generally tangentially of the cage, and the counterbore communicates through a passage 103 with passage 93 and distribution groove 94. A single check valve can be used if passage 103 and passage 93 are formed with a larger cross-section than flow restricting passage 92 to provide a relative low pressure drop through the by-pass passage when the check valve 101 is open. However, it is presently considered more convenient from a manufacturing standpoint to use the same size drills to form passages 92, 93 and 103, and to provide a second check valve for by-passing the flow restrictor passage 92 when the pressure in the first pressure chamber is higher than the pressure at the second port. As shown in FIG. 2, a second check valve 105 is disposed in a counterbore 106 and communicates through passages 107 and 108 with the distribution groove 94. With this arrangement, the passages 92, 93, 103, 107 and 108 can all be formed of the same size and, since passages 93 and 103 are effectively in parallel with passages 108 and 107, the flow area for flow from the first pressure chamber through check valves 101 and 106 to the second port is twice the flow area through passage 92. As best shown in FIGS. 1 and 2, a screen 111 extends around the recess 91 to provide a filter and to also retain the ball checks 101 and 105 in their respective counterbores.

Figure 7:
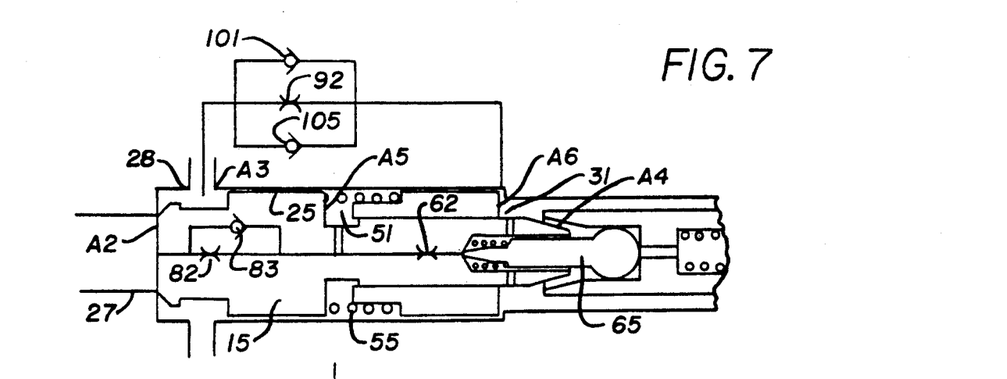
FIG. 7 is a schematic diagram illustrating the valve member in the passages and ports.

Reference is now made more specifically to the diagrammatic illustration of the valve in FIG. 7. When the valve member 15 is closed, the valve member has a net or effective front facing area designated A2 exposed to fluid pressure at the first port 27, and a net or effective front facing differential area designated A3 exposed to fluid pressure at the second port 28. Area A2 is substantially equal to the cross-sectional area of the first port 27 measured at the valve seat 29, and area A3 is substantially equal to the cross-sectional area A1 of the valve bore minus the seat area A2. The valve member has a net or effective rearwardly facing stem area designated A4 in FIG. 7 exposed to fluid pressure in the first pressure chamber 31, which net area is approximately equal to the cross-sectional area of the stem portion 45 of the valve member. The valve member also has a net rearwardly facing differential area designated A5 exposed to fluid pressure in the second pressure chamber 51, which differential area A5 is substantially equal to the cross-sectional area A1 of the valve bore minus the cross-sectional area A4 of the valve stem. The sleeve member 46 has a net rearwardly facing area designated A6 exposed to fluid pressure in the first pressure chamber, which area A6 is substantially equal to the cross-sectional area A1 of the valve bore minus the cross-sectional area A4 of the stem portion 25.

When the pilot valve 64 is closed and pressure at the first port 27 is higher than the pressure at the second port 28, the pressure at the first port acts on front area A2 and this pressure is also transmitted through flow restrictor 82 to the second pressure chamber and acts rearwardly facing differential area A5. The differential area A5 is made greater than the front seat area A2 and the valve member is closed as shown in FIG. 5 by the pressure in the second pressure chamber 51 and the force of spring 55. The first pressure chamber 31 is vented through the second passage means and check valves 101 and 105 to the second port 28. When the second port 28 is the high pressure port and the first port 27 is the low pressure port, the pressure at the second port 28 acts on the front facing differential area A3 and pressure at the second port is transmitted through flow restrictor 92 to the first pressure chamber 31. The fluid pressure in the first pressure chamber acts on the rearwardly facing area A6 of the sleeve member and forces the sleeve member forwardly into engagement with the intermediate portion of the valve member to urge the latter toward a closed position and the pressure in the chamber 31 also acts on the area A4 on the stem of the valve member. The combined areas A6 and A4 are made sufficiently greater than the differential area A3 to press the valve member to its closed position as as shown in FIG. 6.

When the pilot valve 64 is opened, and the pressure at the first port 27 is higher than the pressure at the second port, the second pressure chamber 51 and the first pressure chamber 31 are vented through the check valve 101 and 105 in the second passage means to the lower pressure at the second port 28. The flow restrictor 82 restricts flow through the first flow passage and reduces the pressure in the second and first pressure chambers to a low value such that the high pressure acting on the area A2 of the valve member moves the valve member against spring 55 to an open position as shown in FIG. 1. Conversely, when the fluid pressure at the second port 28 is higher than the fluid pressure at the first port 27, and the pilot valve is opened, the check valve 83 in the first passage means vents the second pressure chamber and the first pressure to the lower pressure at the first passage means and the flow restrictor 92 in the second passage means restricts flow to the first pressure chamber and reduces the pressure on the rearwardly facing areas A6 and A4 so that the sleeve member 46 moves to its retracted position shown in FIG. 7 and the pressure at the second port 28 acting on the differential area A3 moves the valve member to its open position as shown in FIG. 1.

Thus, when the pilot valve 64 is closed, the valve member will close and remain closed independent of whether the first port 27 or the second port 28 is the high pressure port. When the pilot valve is opened, the valve member will also be moved to its open position independent of whether the first port 27 or the second port 28 is the high pressure port.

For example, valves have been made and successfully operated having the following dimensions:

| Area (cm $^2$) | | Orifice Diameter (cm) |
| --- | --- | --- |
| A1 | 1.010 | Pilot Port .071 |
| A2 | .628 | Orifice 82 = .051 |
| A3 | .381 | Orifice 92 = .038 |
| A4 | .034 | |
| A5 | .705 | |
| A6 | .705 | |

Figure 9:
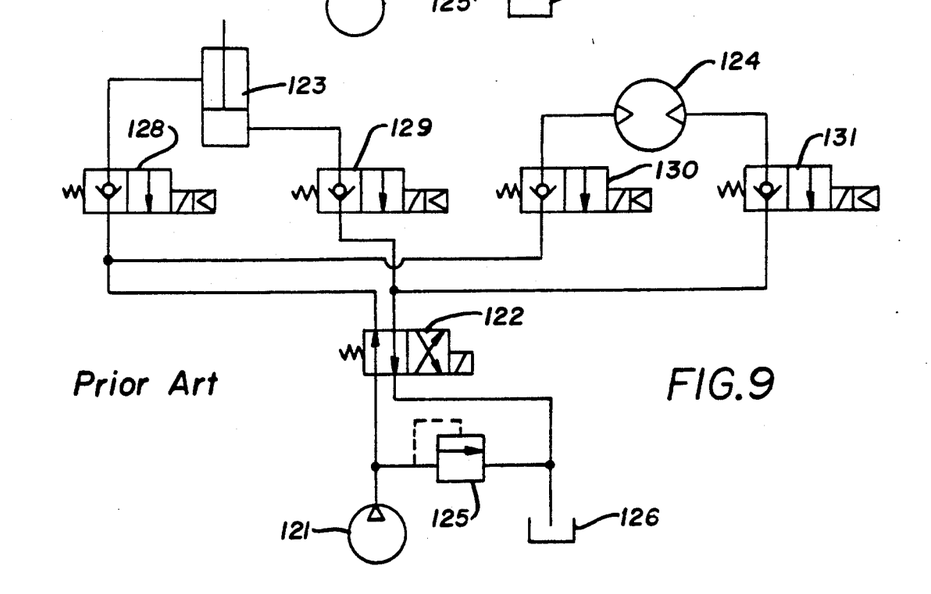
FIG. 9 is a schematic diagram illustrating prior art type pilot operated poppet valves in an hydraulic system.

The normally closed pilot operated bi-directional poppet valve is particularly adapted for use in hydraulic circuits to control directional movement of an hydraulic actuator or hydraulic motor, where it is desired to selectively hydraulically lock an actuator or motor in a moved position. FIG. 9 labeled "Prior Art" illustrates an hydraulic system including a pump 121 and a flow reversing valve 122 for reversibly supplying fluid to an hydraulic actuator 123 and motor 124. A pressure relief valve 125 is connected between the outlet of the pump 121 and a reservoir 126 to limit the maximum discharge pressure. Prior pilot operated poppet valves were not adapted to block flow in both directions when closed and pass flow in both directions when open. It was accordingly a practice to use two such pilot operated poppet valves in the lines to each actuator as schematically illustrated at 128 and 129 in FIG. 9, and similarly to use two such pilot operated poppet valves in the lines to each hydraulic motor as indicated at 131 and 132 in FIG. 9. While the use of two such prior art pilot operated poppet valves did enable locking of the actuator and motor in both directions, it did increase the likelihood of damage to the cylinder and particularly to the cylinder seal due to excessive pressure under certain operating conditions. More particularly, the full area of the cylinder is substantially greater than the effective area at the rod side of the piston, and commonly the ratio of area is about 2:1. Thus, in order to hydraulically balance the piston, the pressure at the rod side of the piston must be substantially higher than the pressure at the face side of the piston. Accordingly, when full relief valve pressure is required to operate motor 124 and this pressure is applied to the cylinder at the face side of the piston, the pressure at the rod side of the piston will rise to a much higher value for example of the order of two times full relief valve pressure in order to maintain the piston in equilibrium. Such high pressure on the rod side of the piston can cause seal damage and reduce the life of the cylinder.

Figure 8:
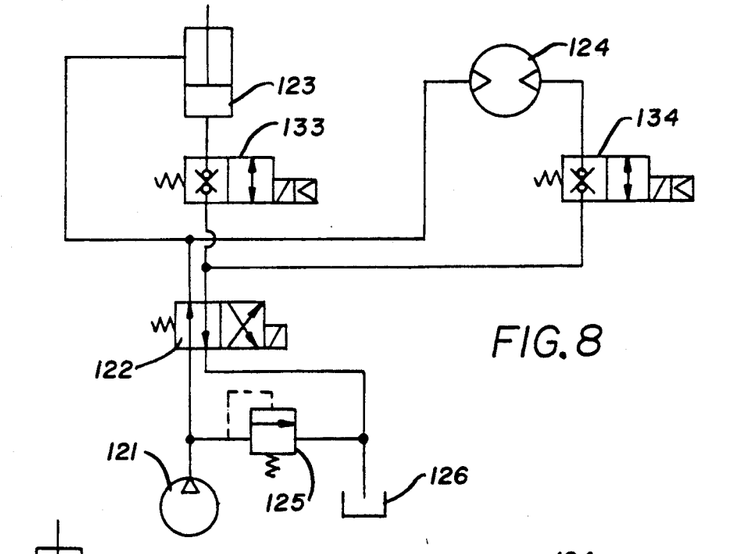
FIG. 8 is a schematic hydraulic diagram illustrating the valve member embodied in an hydraulic system.

An hydraulic system similar to that shown in FIG. 9, and incorporating the normally closed pilot operated bidirectional poppet valves of the present invention is illustrated in FIG. 8. Like numerals are used to designate the same parts and the numerals 133 and 134 are used to designate the pilot valves of the present invention, schematically illustrated in FIG. 8. Since the normally closed pilot operated bi-directional poppet valves 133 and 134 of the present invention are operative to block flow in both directions when the solenoid is deenergized to close the pilot valve, and to allow flow in both directions when the solenoid is energized to open the pilot valve, only one valve is required in the lines to either the actuator 123 or motor 124. This not only reduces the number of valves required in the system and simplifies the manifold and hydraulic lines, but also overcomes the problem of subjecting the rod end of the actuator cylinder to pressures above full pump relief pressure.

The embodiments of the invention in which an exclusive property or privilege is claimed are defined as follows:

1. A normally closed pilot operated bi-directional poppet valve comprising:
   (a) valve casing means defining a valve bore, a valve chamber at one end of the valve bore and a first pressure chamber communicating with an end of the valve bore remote from the valve chamber;
   (b) the casing means having first and second valve ports communicating with the valve chamber and a valve seat coaxial with the valve bore and having a cross-sectional area smaller than the cross-sectional area of the valve bore:
   (c) an elongated valve member including an intermediate portion slidable in the bore; a reduced first end portion extending from a first end of the intermediate portion and having a distal end adapted for engagement with the valve seat to shut-off flow between the first and second ports; a reduced second end portion extending from a second end of the intermediate portion and having a distal end exposed to fluid pressure in said first chamber;
   (d) a sleeve member slidable in the valve bore and slidably engaging said second end portion of the valve member for movement relative thereto between a forward position engaging said intermediate portion and a retracted position engaging an abutment on the casing means, the valve member and sleeve member define a second pressure chamber in the valve bore between the intermediate portion and one end of the sleeve member, the other end of the sleeve member being exposed to fluid pressure in said first pressure chamber;
   (e) a pilot valve passage means for communicating with said first pressure chamber and with said second pressure chamber, pilot valve means for controlling flow through said pilot valve passage means, means yieldably urging the pilot valve to a closed position closing the pilot valve passage means, and solenoid actuator means for actuating the pilot valve means to an open position;
   (f) first passage means communicating said first port with said second pressure chamber, said first passage means having first flow restrictor means therein and first check valve means operative to by-pass said first flow restrictor means when the pressure at the second pressure chamber is greater than the pressure at said first port;
   (g) second passage means communicating said second port with said first pressure chamber, said second passage means having second flow restrictor means therein and second check valve means operative to by-pass said second flow restrictor means when the pressure in the first chamber is greater than the pressure at said second port.

2. A pilot operated bi-directional valve according to claim 1 wherein the pilot valve passage means is in said valve member and said pilot valve means includes a pilot valve seat in said second end portion of the valve member and a pilot valve member movable relative to said pilot valve seat.

3. A pilot operated bi-directional valve according to claim 1 wherein said first passage means and said pilot valve passage means comprises a stepped bore extending axially through the valve member and at least one lateral opening intermediate the ends of the stepped bore and communicating the stepped bore with the second pressure chamber.

4. A pilot operated bi-directional valve according to claim 3 wherein said first check valve means is disposed in said stepped bore at a location intermediate said lateral opening and the distal end of the first end portion of the valve member, said pilot valve means including a pilot valve seat in said stepped bore at a location intermediate said lateral opening and the distal end of the second end portion of the valve member.

5. A pilot operated bi-directional valve according to claim 1 wherein said pilot valve means includes a pilot valve seat on the second end portion of the valve member, said solenoid actuator means including a guide tube aligned with the stem portion of the valve member and communicating with said first pressure chamber, a solenoid surrounding the guide tube, a plunger slidable in the guide tube, and a pilot valve member connected to the plunger for axial movement thereby.

6. A pilot operated bi-directional valve according to claim 1 wherein the sleeve member is adapted to move into engagement with the intermediate portion of the valve member when the pressure in said first pressure chamber is greater than the pressure in said second pressure chamber.

7. A pilot operated bi-directional valve according to claim 1 wherein the second flow restrictor means is operative, when the pressure at the second port is greater than the pressure at the first port and the pilot valve is open, to restrict flow through the second passage means and reduce fluid pressure in the first pressure chamber to a valve sufficiently below the pressure at the second port such that pressure at the second port moves the valve member to an open position.

8. A pilot operated bi-directional valve according to claim 1 wherein the first flow restrictor means is operative, when the fluid pressure at the first port is greater than the fluid pressure at the second port and the pilot valve is open, to restrict flow through the first passage means and reduce the fluid pressure in the second pressure chamber to a value sufficiently below the pressure at the first port such that pressure at the first port moves the valve member to an open position.

9. A pilot opened valve according to claim 1 wherein said pilot valve passage means is in said valve member, said first passage means and said first flow restrictor means and said first check valve means is in said valve member, and said second passage means and said second flow restrictor means and said second check valve means is in said valve casing means.

10. A pilot operated bi-directional poppet valve according to claim 1 wherein second flow passage means is in said casing means, said valve casing means including a cartridge having an outwardly opening flow distribution groove, said second passage means communicating with said outwardly opening flow distribution groove, and a filter ring extending around the groove.

11. A pilot operated bi-directional valve according to claim 10 wherein said second check valve means includes a check valve seat recessed below a bottom of the groove and a ball member cooperable with the check valve seat to control flow therethrough, the filter ring being arranged to limit displacement of the ball valve relative to the seat.

12. A pilot operated bi-directional poppet valve according to claim 1 wherein said first passage means is in the valve member, the first check valve means including an annular set in said first passage means and a disk valve member cooperable with said annular set, said first flow restrictor means comprising a restricted opening through said disk valve member.

13. A normally closed pilot operated bi-directional poppet valve comprising:
(a) valve casing means defining a valve bore having a cross-sectional area A1, a valve chamber at one end of the valve bore and a first pressure chamber communicating with an end of the valve bore remote from the valve chamber;
(b) the valve casing means having first and second valve ports communicating with the valve chamber and a valve seat coaxial with the valve bore and the valve seat having a cross-sectional area smaller than the cross-sectional area of the valve bore;
(c) an elongated valve member including an intermediate portion slidable in the bore; a reduced first end portion extending from a first end of the intermediate portion and having a distal end adapted for engagement with the valve seat to shut-off flow between the first and second ports; a reduced second end portion extending from a second end of the intermediate portion and having a distal end exposed to fluid pressure in said first chamber, the valve member, when closed, having a net forward facing seat area A2 exposed to fluid pressure at the first port; a net forward facing differential area A3 exposed to fluid pressure at the second port; a net rearward facing stem area A4 exposed to fluid pressure in the first pressure chamber and net rearward facing differential area A5 exposed to fluid pressure in the second pressure chamber,
(d) a sleeve member slidable in the valve bore and slidably engaging said second end portion for movement relative thereto between a forward position engaging said intermediate portion and a retracted position engaging an abutment on the casing means, the valve member and sleeve member defining a second pressure chamber in the valve bore between the intermediate portion and one end of the sleeve member, the other end of the sleeve member having a net rearward facing area A6 exposed to fluid pressure in said first pressure chamber;
(e) pilot valve passage means including a pilot valve port for communicating with said first pressure chamber and with said second pressure chamber, pilot valve member for controlling flow through said pilot valve port, spring means yieldably urging the pilot valve member to a closed position closing the pilot valve port, and solenoid actuator means for actuating the pilot valve member to an open position;
(f) first passage means communicating said first port with said second pressure chamber, said first passage means having first flow restrictor means therein and first check valve means operative to by-pass said first flow restrictor means when the pressure at the second pressure chamber is greater than the pressure at said first port;
(g) second passage means communicating said second port with said first pressure chamber, said second passage means having second flow restrictor means therein and second check valve means operative to by-pass said second flow-restrictor means when the pressure in the first chamber is greater than the pressure at said second port,
(h) said sleeve member being movable to said forward position engaging the intermediate portion when the pressure in the first chamber is greater than the pressure in the second chamber.

14. A pilot operated bi-directional valve according to claim 13 wherein area A3 is substantially equal to area A1 minus area A2 and the area A5 is substantially equal to the area A1 minus the area A4.

15. A pilot operated bi-directional valve according to claim 14 wherein the area A5 is greater than the area A2.

16. A pilot operated bi-directional valve according to claim 15 wherein the sleeve member is forced against the intermediate portion of the valve member when the pressure in the first pressure chamber is greater than the pressure in the second pressure chamber.

17. A pilot operated bi-directional valve according to claim 13 wherein the second flow restrictor means is operative, when the pressure at the second port is greater than the pressure at the first port and the pilot valve is open, to restrict flow through the second passage means and reduce fluid pressure in the first pressure chamber to a value sufficiently below the pressure at the second port such that pressure at the second port acting on area A2 of the valve member is operative to move the valve member to an open position.

18. A pilot operated bi-directional valve according to claim 13 wherein the first flow restrictor means is operative when the fluid pressure at the first port is greater than the fluid pressure at the second port and the pilot valve is opened to restrict flow through the first passage means and reduce the fluid pressure in the second pressure chamber to a pressure sufficiently below the pressure at the first port such that pressure at the first port moves the valve member to an open position.

19. A pilot operated bi-directional valve according to claim 13 wherein the pilot valve port has a preselected flow area and the flow area of each the first flow restrictor means and the second flow restrictor means is less than said preselected flow area.

* * * * *

UNITED STATES PATENT AND TRADEMARK OFFICE
CERTIFICATE OF CORRECTION

PATENT NO. : 5,174,544
DATED : Dec. 29, 1992
INVENTOR(S) : Faraidoon Emanie

It is certified that error appears in the above-identified patent and that said Letters Patent is hereby corrected as shown below:

Claim 12, column 9, line 55, change "set" to -- seat --;

line 56, change "set" to -- seat --.

Signed and Sealed this

Nineteenth Day of October, 1993

Attest:

BRUCE LEHMAN

*Attesting Officer*     *Commissioner of Patents and Trademarks*